1,524,613

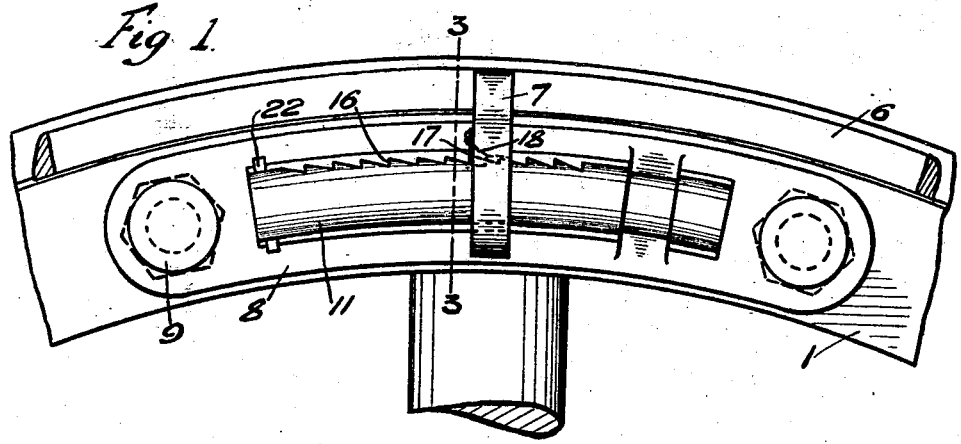
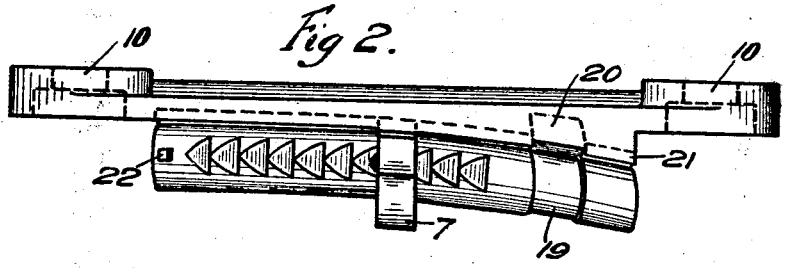
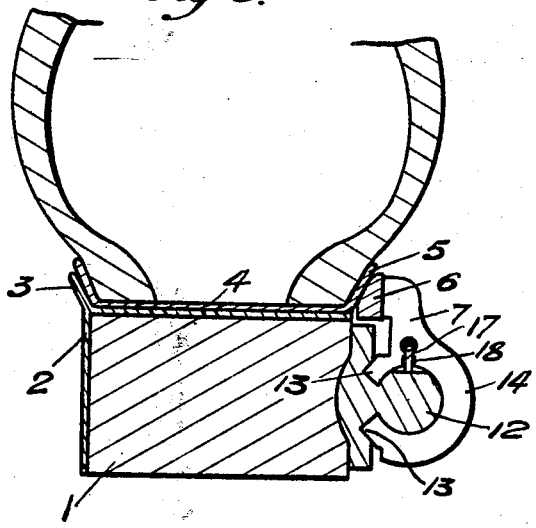
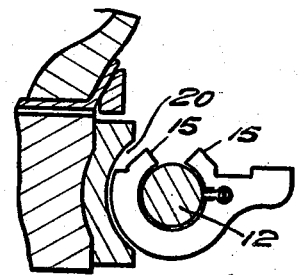
Inventor
William A. Antilotti
Edgar C. Jones
By
Attorney Jan. 27, 1925.
W. A. ANTILOTTI ET AL
1,524,613
RIM AND MUD LUG
Filed May 11, 1922 2 Sheets-Sheet 2
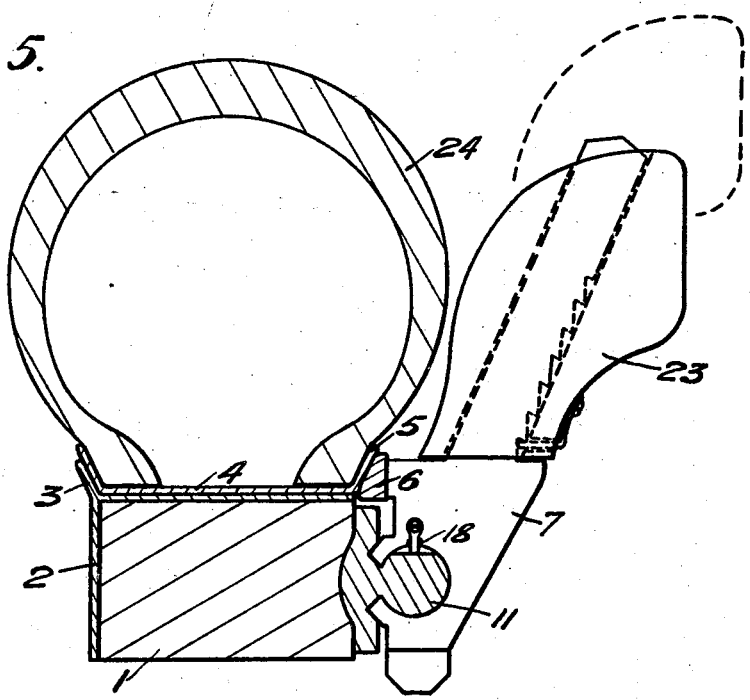
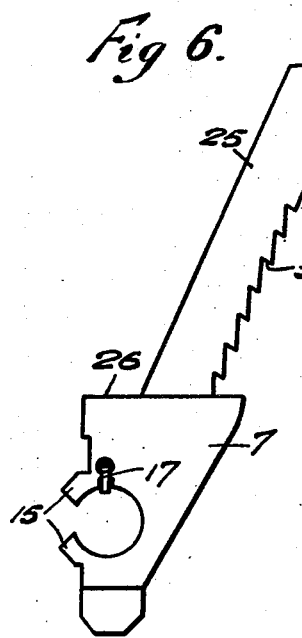
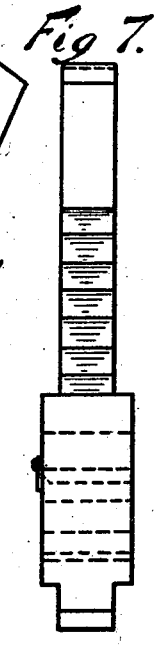
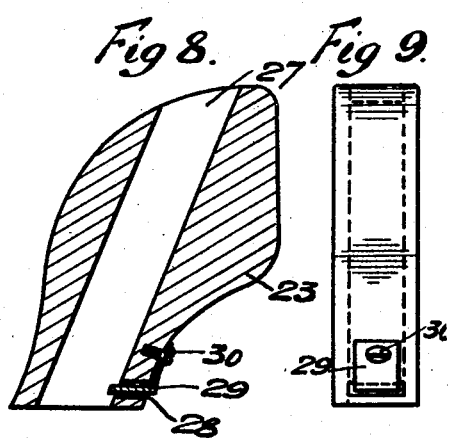
Inventor
William A. Antilotti
Edgar C. Jones
By
Attorney Patented Jan. 27, 1925.

UNITED STATES PATENT OFFICE.

WILLIAM A. ANTILOTTI AND EDGAR C. JONES, OF ATLANTA, GEORGIA.

RIM AND MUD LUG.

Application filed May 11, 1922. Serial No. 560,135.

*To all whom it may concern:*

Be it known that we, WILLIAM A. ANTILOTTI and EDGAR C. JONES, citizens of the United States, residing at Atlanta, in the county of Dekalb and State of Georgia, have invented new and useful Improvements in Rim and Mud Lugs, of which the following is a specification.

This invention relates to devices for securing demountable rims on vehicle wheels and has for its principal object the provision of means functioning by wedge-like action to hold the rim securely upon the felly of the wheel, said means being guided by a track secured to the felly, which track and wedging means are cooperably shaped to hold the latter in rim engaging position throughout the major portion of the range of travel of said wedging means upon said track, but being so shaped at one point as to permit the movement of the wedging means in a direction transversely of the rim and track so as to place the wedging means out of rim engaging position and thus permit the removal of the rim.

Another object of the invention is the construction of a rim securing device as above described, the wedging element of which is provided with a road engaging mud lug, the latter functioning to tighten the grip of the wedging member against the rim when the wheel is subjected to the additional tractive load imposed upon it in traveling through heavy roads.

Another object of the invention is the provision of the mud lug with a telescopic tractive element automatically adjustable from maximum to minimum extension to suit various tractive conditions.

This invention is an improvement on the device disclosed and claimed in our pending application No. 479,289, filed June 21, 1921, and contemplates the realization in an improved manner of all the broad objects for which the original device was invented.

With the above and other objects in view, my invention consists in the improved rim and mud lugs illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a side elevation of a portion of the felly of an automobile wheel having my improved rim lug applied thereto.

Figure 2 is a plan view of the rim lug mechanism shown in Figure 1.

Figure 3 is a cross sectional view taken along the line 3—3 of Figure 1, showing the rim lug in rim engaging position.

Figure 4 is a detail of Figure 3, in section, showing the rim lug swung out of rim engaging position.

Figure 5 is a cross sectional view of a portion of the felly and rim of an automobile wheel showing a modified form of rim lug having an adjustable tractive portion.

Figures 6 and 7 are, respectively, a side elevation and a front view of the rim lug shown in Figure 5 with the adjustable tractive element removed therefrom.

Figures 8 and 9 show, respectively, in section and front elevation, the adjustable tractive element.

Referring now in detail to the several figures, the numeral 1 designates the felly of an automobile wheel which is shod on its periphery and one of its side surfaces with the metallic fixed rim 2, the latter having an upturned flange 3, forming an annular abutment for limiting the inward movement of the demountable rim 4 which is adapted to be telescopically arranged with respect to the fixed rim 2.

The demountable rim 4 may be of any desired type such as is in common use on wheels of pneumatic tired vehicles, but which is here contemplated, although not so specifically shown, as a transversely split rim from which the casing of the pneumatic tire may be removed in a well known manner which it is not considered necessary to describe here.

The demountable rim 4 is provided with a front flange 5 and is held in place by the pressure against said flange of a hoop or ring, a portion of which is shown in cross section at 6. This ring is provided to take the thrust of the rim lugs 7, a number of which lugs are intended to be arranged at intervals around the felly of the wheel. It is in the construction of the rim lug and in the means for carrying the same upon the felly that the present invention resides.

A base plate 8 is secured to that side of the felly which is opposite the upturned flange 3 by means of bolts 9 which pass through counterbored apertures 10 near the ends of said base plate and through aligning apertures bored through the felly. The base plate follows the curvature of the felly and carries integrally therewith or secured thereto a projecting track 11 which also follows the curvature of the felly, and in addition is curved divergently outward at a small angle to the front face of the felly as is clearly shown in Figure 2. This track comprises a bead 12, shown in Figures 3 and 4, of substantially circular cross section, which joins the base plate 8, the latter being provided with a pair of grooves 13 one lying on each side of the base of said bead. Each rim lug 7 is formed with an enlarged end 14 having a central aperture which slidably fits the bead 12 of said track, said enlarged portion being also provided with extensions 15 which fit the grooves 13 and are slidable therein. This construction prevents the transverse turning of the rim lug on the track, the bottom walls of the grooves 13 cooperating with the extensions 15 to maintain the rim lug in a position in the path of transverse movement of the demountable rim 4, thus preventing the lateral displacement of said rim.

In order to tighten the rim lug against the rim it is merely necessary to push said rim lug to the left as viewed in Figures 1 and 2 so that it travels along the inclined track toward the ring 6, engaging the latter with a wedge-like action. The final tightening of the rim lug against said ring is accomplished by tapping it with any convenient instrument so as to cause it forcibly to wedge itself between the ring 6 and the track 11. The upper surface of said track is provided with a plurality of ratchet teeth 16, the abrupt shoulders of which face in the direction of tightening of the rim lug. A spring detent 17 is carried by said rim lug in any desirable manner and a slight recess 18 is provided in the rim lug behind said spring detent so as to permit said detent to flex in either direction. When the rim lug is moved in a direction to move the ring 6 against the flange 5 of the rim, the detent 17 passes over the sloping shoulders of the ratchet teeth 16 and springs over said abrupt shoulders thus avoiding accidental loosening of the rim lug, but said detent and abrupt shoulders do not, however, prevent the forcible movement of the rim lug in a direction to release the ring 6 when the impact of a tool or other instrument is applied thereto. The track 11 is slightly reduced in diametric as at 19, adjacent that end which lies farthest from the felly and the base plate 8 is cut away beneath the reduced portion of said track forming a tunnel 20 within which the enlarged portion 14 of the rim lug can freely rotate. This is shown in Figure 4. When it is desired to remove the demountable rim from the felly of the wheel, the rim lug 7 is moved longitudinally of the track 11 to a position of alignment with the reduced portion 19 of the track, at which point it may be partially rotated upon the track so as to be swung clear of the transverse path of movement of the demountable rim to permit the removal of the ring 6 and of said rim from the felly of the wheel.

The grooves 13 are continued beyond the tunnel 20 as shown at 21 (Fig. 2) so that the rim lug 7 may be freely removed from the track if desired. This feature, however, finds its greatest utility in the initial assembling of the lug upon the track 11. A stop 22 is formed on said track at the end of the latter opposite the reduced portion 19 which prevents the rim lug being forced off said end of said track.

The great advantage of this mud lug over existing constructions is that it requires no special tool or wrench for its operation, that it finds a new seat for itself on the ring 6 as the parts become worn, thus avoiding all looseness, noise and danger of accident, and that it is not readily lost, it being unnecessary ever to remove the rim lug from the track after its initial assemblage thereon.

In the form shown in Figure 5 the principle of operation is the same as in that shown in Figs. 1 to 4, inclusive except that the undercut tunnel 20 is omitted, the rim lug 7 being slid completely off of the track 11, instead of being given partial rotation thereon when it is desired to remove the rim from the felly. In this form the rim lug is extended radially of the wheel at one side of the tire 24 to form a mud lug 23 which is adapted to make traction with the road when the tire sinks into soft ground. The mud lug 23 is made adjustable in depth and to this end the rim lug 7 is provided with a shank 25 extending obliquely from an upper shoulder 26 formed on said rim lug and is adapted to slidably engage within an aperture 27 formed within the mud lug 23. Said mud lug is provided near its inner end with a transverse slot 28 which communicates with the bore aperture 27 and through which extends the lower end of a spring detent 29 fixed to the mud lug by means of the screw 30. The shank 25 is provided with a ratchet face, engageable with said spring detent, the teeth of said ratchet face being provided with abrupt shoulders 31 facing toward the shoulder 26 of the rim lug. When the mud lug 23 telescopes upon the shank 25, as is shown in Figure 5, the detent 29 moves over and engages the ratchet teeth thereof, permitting the inward movement of the mud lug but preventing the outward extension thereof due to the abutment of the detent 29 against the abrupt shoulders 31 of the ratchet teeth.

In normal operation the mud lug 23 is set to an outward position, as shown in dotted lines in Figure 5, for travelling in soft ground. As the thrust of the ground against the mud lug is mainly in a sidewise direction and not upwardly, there will be little or no tendency to force the mud lug to its inward position, but should the mud lug strike upon a solid obstruction such as a rock it will at once move toward the shoulder 26 of the rim lug 7 due to the springing of the detent 29 over the ratchet teeth, and be forced inwardly and thus be protected against damage. This construction also makes it unnecessary to replace the rim lugs having mud lugs with those not equipped with mud lugs when travelling upon paved streets or in dry weather, since the mud lugs, when they strike hard or paved surfaces, will at once be pushed inwardly to the position shown in Figure 5 and remain out of tractive relation with the road bed until again manually drawn out to their extended position.

Having described our invention what we claim as new and desire to secure by Letters Patent, is:—

1. In combination a felly, a demountable rim therefor, a plurality of means for securing said rim to said felly, at least one of which includes a lug, means on said felly for supporting said lug, in rim engaging position, said lug being slidable along said means, said means and said lug being so cooperably shaped at one point as to permit said lug to swing out of rim engaging position while being retained by said supporting means.

2. Means for securing a demountable rim to a felly comprising a base plate adapted to be secured to the felly and a lug adapted to engage the demountable rim, said base plate being provided with a track element extending in a direction divergent to the side of the felly when said base plate is attached thereto, said lug being slidable along said track and formed to interlock therewith against lateral disconnection, said lug and track element being so shaped as to support said lug in position to engage the rim.

3. Means for securing a demountable rim to a felly, comprising a base plate adapted to be secured to the felly and a lug adapted to engage the demountable rim, said base plate being provided with a track element extending in a direction divergent to the side of the felly when the base plate is attached thereto, said lug being slidable along said track and formed to interlock therewith against lateral disconnection, said lug and track element being so shaped as to support said lug in position to engage the rim through the major part of its range of sliding movement, said track element being shaped at one point to permit said lug to swing out of rim-engaging position.

4. In combination a felly, a demountable rim therefor, a plurality of means for securing said rim to said felly, at least one of which includes a lug, a track mounted on said felly and following the curvature thereof, said track including a longitudinally arranged bead inclined divergently to the side of said felly, said rim lug being provided with an opening partially surrounding said bead sufficiently to be retained thereby and slidable thereon, means associated with said bead and cooperating with said rim lug to prevent rotation of the latter during the major portion of its range of movement along said bead, said means being cut away at a point adjacent that end of said bead which is most remote from said felly to permit rotation of said rim lug.

5. In combination a felly, a demountable rim therefor, a plurality of means for securing said rim to said felly, at least one of which includes a lug, a track mounted on said felly including a base plate, a bead running longitudinlly of said base plate and inclined thereto angularly to the side of said felly, a groove in said base plate at the bottom of said bead, said rim lug being provided with an opening partially surrounding said bead to be retained thereby, and slidable thereon, said rim lug having an extension cooperating with a wall of said groove to maintain said rim lug in rim engaging position during the major portion of its range of sliding movement along said bead, the walls of said groove being cut away adjacent that end of said bead which is most remote from said felly to permit said rim lug to swing out of rim engaging position, when in registry with said cut away portion.

6. In combination a felly, a demountable rim therefor, a plurality of means for securing said rim to said felly, at least one of which includes a lug, a track mounted on said felly comprising a base plate, a bead arranged longitudinally of said base plate and inclined divergently to the side of said felly, a groove in said base plate at the bottom of said bead, said rim lug being provided with an opening partially surrounding said bead and retained thereby, a portion of said rim lug cooperating with a wall of said groove to maintain said rim lug in rim engaging position during the major portion of travel of said rim lug along said bead, the walls of said groove being cut away at a point adjacent that end of said bead which is most remote from said felly to permit said rim lug to rotate about said bead out of rim engaging position, cooperating latching means on said bead and rim lug to prevent accidental displacement of said rim lug from a tightened position, said latching means being yieldable to permit movement of said rim lug in a loosening direction when sufficient directive force is applied to said rim lug.

7. In combination a felly, a demountable rim therefor, a plurality of means for securing said rim to said felly, at least one of which includes a lug, a track mounted on said felly comprising a base plate, a bead arranged longitudinally of said base plate and inclined divergently to the side of said felly, a groove in said base plate at the bottom of said bead, said rim lug being provided with an opening partially surrounding said bead and retained thereby, a portion of said rim lug cooperating with a wall of said groove to maintain said rim lug in rim engaging position during the major portion of travel of said rim lug along said bead, the walls of said groove being cut away at a point adjacent that end of said bead which is most remote from said felly to permit said rim lug to rotate about said bead out of rim engaging position, cooperating ratchet and detent mechanism on said bead and rim lug to prevent accidental displacement of said rim lug from a tightened position, said ratchet and detent mechanism being yieldable to permit movement of said rim lug in a loosening direction when sufficient directive force is applied to said rim lug.

8. In combination a felly, a demountable rim therefor, a plurality of means for securing said rim to said felly, at least one of which includes a lug, a track mounted on said felly including a base plate, a bead running longitudinally of said base plate and inclined thereto angularly to the side of said felly, a groove in said base plate, at the bottom of said bead, said rim lug being provided with an opening partially surrounding said bead to be retained thereby, and slidable thereon, said rim lug having an extension cooperating with a wall of said groove to maintain said rim lug in rim engaging position, a stop at that end of said bead which lies closest to the felly to limit the sliding movement of said rim lug in one direction, said rim lug being freely removable from the other end of said bead.

9. In combination a felly, a demountable rim therefor, a plurality of means for securing said rim to said felly, at least one of which includes a lug, a track mounted on said felly including a base plate, a bead running longitudinally of said base plate and inclined thereto in a plane perpendicular to the plane of rotation of said felly, a groove in said base plate at the bottom of said bead, said rim lug being provided with an opening partially surrounding said bead to be retained thereby, and slidable thereon.

10. In combination a felly, a demountable rim therefor, a plurality of means for securing said rim to said felly, at least one of which includes the following instrumentalities, a track element secured to said felly and a lug interlocking therewith, said lug being slidable along said track element in a path divergent to the side of said felly, said lug and track element being cooperably so shaped as normally to support the lug in position to engage the rim.

In testimony whereof we have hereunto set our hands in presence of two subscribing witnesses.

WILLIAM A. ANTILOTTI.
EDGAR C. JONES.

Witnesses:
J. CLIFF WILSON,
MAYNARD B. SMITH.